(12) United States Patent
Harrington (10) Patent No.: US 8,596,949 B2
(45) Date of Patent: Dec. 3, 2013

(54) CONSTANT TORQUE VEHICLE RESTRAINT

(75) Inventor: David Harrington, Port Hope (CA)

(73) Assignee: Nordock, Inc., Bowmanville/Ontario (CA)

( * ) Notice: Subject to any disclaimer, the term of this patent is extended or adjusted under 35 U.S.C. 154(b) by 499 days.

(21) Appl. No.: 12/655,339

(22) Filed: Dec. 29, 2009

(65) Prior Publication Data

US 2011/0158778 A1    Jun. 30, 2011

(51) Int. Cl.
   *B65G 67/00*    (2006.01)
(52) U.S. Cl.
   USPC .......................................................... 414/401
(58) Field of Classification Search
   USPC ................. 414/401, 584; 318/62, 9, 10, 11
   See application file for complete search history.

(56) References Cited

U.S. PATENT DOCUMENTS

| | | | | |
|---|---|---|---|---|
| 4,264,259 A | 4/1981 | Hipp | | 414/401 |
| 4,488,325 A | 12/1984 | Bennett et al. | | 414/401 |
| 4,560,315 A | 12/1985 | Hahn | | 414/401 |
| 4,648,781 A * | 3/1987 | Sikora | | 414/401 |
| 4,843,373 A * | 6/1989 | Trickle et al. | | 340/540 |
| 4,938,647 A | 7/1990 | Erlandsson | | 414/401 |
| 4,964,777 A | 10/1990 | Kleynjans et al. | | 414/401 |
| 5,096,359 A | 3/1992 | Alexander | | 414/401 |
| 5,453,735 A * | 9/1995 | Hahn | | 340/687 |
| 6,116,839 A * | 9/2000 | Bender et al. | | 414/401 |
| 6,162,005 A * | 12/2000 | Fritz | | 414/401 |
| 6,190,109 B1 * | 2/2001 | Bender | | 414/401 |
| 6,431,819 B1 * | 8/2002 | Hahn | | 414/809 |
| 6,975,226 B2 * | 12/2005 | Reynard et al. | | 340/540 |
| 7,274,300 B2 * | 9/2007 | Duvernell et al. | | 340/686.6 |
| 7,384,229 B2 | 6/2008 | Gleason | | 414/401 |
| 7,420,344 B2 * | 9/2008 | Zhong | | 318/434 |

OTHER PUBLICATIONS

Bodine Direct.com; "Your Online Solution for Electric Motors and Drivers"; Power Transmission Spec.; pp. 1-3; Sep. 24, 2009.

* cited by examiner

*Primary Examiner* — Saul Rodriguez
*Assistant Examiner* — Glenn Myers
(74) *Attorney, Agent, or Firm* — Jeffrey S. Sokol (57) ABSTRACT

The present invention is an impact vehicle restraint with a constant-torque, multi-mode electric motor to secure the ICC bar of a trailer to a loading dock. A mounting plate anchors a carriage to the front of the loading dock. The carriage is biased to a raised position and has a pair of spaced shear plates that house a hook. An electric gearmotor rotates the hook between retracted and extended positions. When extended, the hook secures and holds the ICC bar to the dock. The motor has a higher power level or mode to raise and lower the hook, and a lower power level or mode to continuously adjust the position of the hook and keep it in forced engagement with the ICC bar during the process of loading and unloading the trailer. A control system cycles the motor and hook through an operating cycle.

9 Claims, 7 Drawing Sheets

CONSTANT TORQUE VEHICLE RESTRAINT

FIELD OF THE INVENTION

The invention pertains to an impact vehicle restraint that applies a constant torque to an engagement hook to securely engage and continuously adjust the hook to hold a trailer to a loading dock during the process of loading and unloading the trailer.

BACKGROUND OF THE INVENTION

Vehicle restraints are utilized to increase safety at a loading dock. The restraints secure a truck trailer to the loading dock structure or building when goods are transferred between the trailer and the building. The restraints typically engage a rear horizontal bar referred to as the rear impact guard (RIG) or ICC bar. The RIG or ICC bar is located at the rear end of the trailer below the trailer bed. When the trailer is backed up to an available loading dock stall, the ICC bar is positioned close to the face wall of the dock. Bumpers typically extend from the face wall to protect the trailer, dock and any dock leveling fixture at the dock. Trailer restraints typically include a hooking device located in front of the dock and anchored to the dock or ground. When in use, the hooking device forms a barrier in front of the ICC bar to secure the trailer so that it cannot move away from the dock. The restraint helps avoid accidents by securing the trailer to the loading dock so that the truck driver does not inadvertently pull the trailer away when the trailer is being loaded or unloaded. The restraint also helps prevent the trailer from being pushed away from the dock during the process of loading and unloading the trailer. For example, a fork lift, particularly one carrying heavy cargo that rides onto the trailer and abruptly stops, tends to move the trailer away from the dock.

Conventional trailer restraints include storable restraints and impact restraints. Storable restraints move between a raised operating position and a lower stored position. When in the stored position, a trailer should clear the device as it is being backed into an available loading dock stall. Conventional storable restraints are disclosed in U.S. Pat. Nos. 4,488,325, 5,096,359, 4,964,777 and 7,384,229. When the trailer and dock leveler are properly positioned with the lip of the leveler resting on the trailer bed, the stored restraint is activated to rise up and securely engage the RIG. Restraint mechanisms of this style are powered into their raised position by motors, springs, or other mechanical means. Impact restraints include a movable carriage that adjusts to the height of the trailer RIG. The incoming RIG engages a sloped portion of a carriage, which pushes the carriage down and into aligned engagement with the RIG as disclosed in U.S. Pat. Nos. 4,264,259, 4,560,315 and 6,162,005. The carriage has a drive system with a motor that rotates a hook from a release position to a securing or locking position. An operator actuates the motor when the RIG engages and aligns over the carriage. The motor rotates the hook so that it emerges from the carriage and securely engages the RIG.

A problem with impact trailer restraints is that the hook drive system is susceptible to wear and tear that can produce unsafe conditions during use when the trailer is being loaded and unloaded. Slip clutches are prone to wear and require frequent replacement and servicing to prevent the hook from dropping down during use. Drive systems with a brake suffer from this same wear and tear. Even though the brake is released during use, after the hook is positioned into engagement with the RIG and the brake is applied, the brake is subject to friction and slippage in the same manner as the slip clutch system. When the slip clutch or brake is worn, the hook is not held in place with sufficient force and is susceptible to allowing the hook to inadvertently drop down and out of engagement with the RIG during use, and putting the safety of the workers at risk.

Another problem with impact trailer restraints is that the hook can be forced down and out of engagement with the RIG by certain movements of the trailer during the process of loading and unloading the trailer. The hook drive systems do not adequately accommodate the up and down, back and forth (i.e., trailer rocks toward and away from dock "dock walk") and vibrational movements of the RIG during the loading and unloading process, such as when fork lifts move heavy cargo on and off the trailer. When the hook is engaged, the drive system does not automatically reposition the hook to accommodate these trailer movements. This can result in the hook inadvertently walking off or disengaging the RIG during use, and putting the safety of the workers at risk. Drive systems using a slip clutch or brake turn off or disengage the hook motor once the hook is raised into engagement with the RIG. However, movements of the trailer and RIG during the loading and unloading process can cause the hook to move down and disengage the RIG. Drive systems that use a brake also allow for slippage once the brake is applied during the loading and unloading process. Drive systems with a clutch or brake slip when the trailer moves from its original position during use, but do not automatically reposition the hook against the RIG when the trailer moves back to or near its original position during use, which if not corrected, can create an unsafe condition.

A further problem with trailer restraints is their harsh working environment. Vehicle restraints are mounted outside near the ground where dirt, debris, snow, ice, rain, humidity and temperature all contribute to the wear and tear on the device. The component parts of the restraints deteriorate over time, which causes binding and even the failure of the device. An impact style restraint or a trailer can be damaged when the ICC bar impacts a binding or frozen carriage and attempts to force it down. Solid debris such as rocks, wood or metal can collect beneath an impact type restraint when it is in use, which interferes with the proper movement of the carriage. In addition, attempts to protect moving parts and any sensors via a separate outer housing have been largely unsuccessful. Impact restraints require the hook to extend from the housing, the performance of which can be impaired by the harsh environment.

The present invention is intended to solve these and other problems.

SUMMARY OF THE INVENTION

The present invention relates to an impact vehicle restraint with a constant-torque, multi-mode electric motor to secure the ICC bar of a trailer to a loading dock. A mounting plate anchors a vertical track and movable carriage to the front of the loading dock. The carriage is biased to a raised position and has a pair of spaced shear plates that house and secure a rotatable hook. An electric gearmotor rotates the hook between retracted and extended positions. When extended, the hook secures and holds the ICC bar to the dock. The motor has a higher power level or mode to raise and lower the hook, and a lower power level or mode to continuously adjust the position of the hook and keep it in forced engaged with the ICC bar during the process of loading and unloading the trailer. A control system is provided to cycle the motor and hook through an operating cycle.

An advantage of the present impact trailer restraint is that the hook drive system is not prone to the wear and tear that can produce unsafe conditions during use. The restraint includes a continuous duty electric motor that continuously adjusts the hook into engagement with the ICC bar during the loading and unloading process. The restraint does not include a slip clutch or brake that wears out and require frequent replacement and servicing to prevent the hook from dropping down during use. Instead, the motor output shaft can move with the movement of the trailer during use without wear and tear on the motor and its component parts.

Another advantage of the present impact vehicle restraint is that the continuously running motor will force the hook back into engagement with the RIG even when trailer movements during the process of loading and unloading the trailer separate the hook from the RIG. The hook drive system accommodates the up and down, back and forth (i.e., trailer rocks toward and away from dock "dock walk") and vibrational movements of the RIG during the loading and unloading process. When the motor and hook are engaged, the drive system automatically repositions the hook to accommodate the trailer movements.

A further advantage of the present impact vehicle restraint is its weather resistant design. The components are enclosed in the carriage and protected from dirt, debris, snow, ice, rain, humidity that can contribute to the wear and tear on the device. The component parts of the restraints do not deteriorate over time, which improves the reliability and working life of the device.

Other aspects and advantages of the invention will become apparent upon making reference to the specification, claims and drawings.

DESCRIPTION OF THE PREFERRED EMBODIMENTS

While this invention is susceptible of embodiments in many different forms, the drawings show and the specification describes in two preferred embodiments of the invention. It should be understood that the drawings and specification are to be considered an exemplification of the principles of the invention. They are not intended to limit the broad aspects of the invention to the embodiments illustrated.

Figure 1:
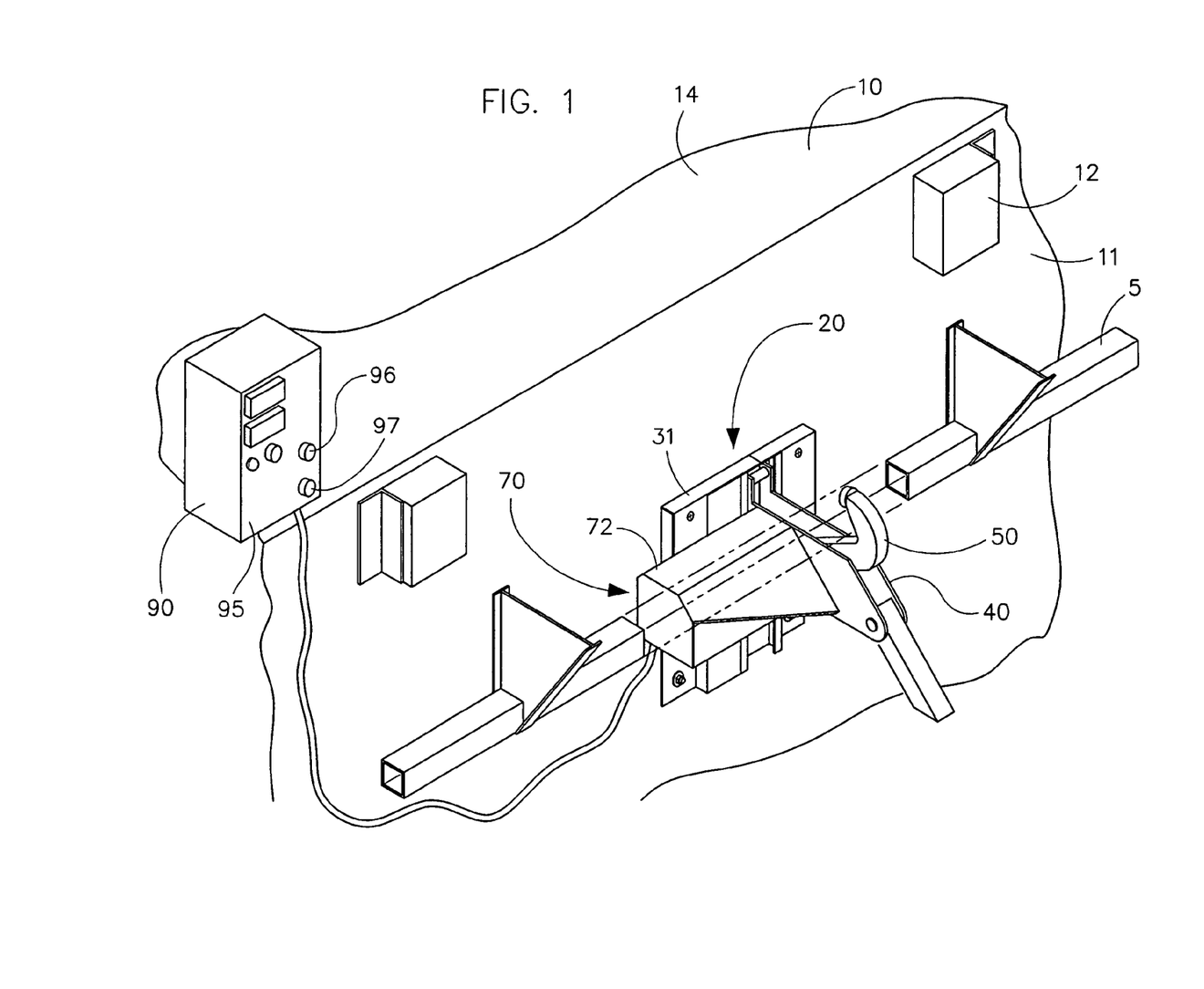
FIG. 1 is a perspective view of the present vehicle restraint invention secured to a loading dock and in its operative raised position.

Conventional truck trailers have a rear impact guard (RIG) or ICC bar 5 used to facilitate loading and unloading the vehicle. The elongated bar 5 typically parallel to and spans the width of the rear end of trailer. The bar 5 has a square or rectangular cross-sectional shape with four-sides as shown in FIG. 1. The bar 5 has a lower or downward facing surface that is generally normal to its forward facing or front surface. When the trailer is backed into a loading dock 10, the rear end of the trailer is generally parallel to and moves toward the face or front wall 11 of the dock. The vertical face 11 of the dock 10 typically has one or more bumpers 12 to help prevent inadvertent damage to the dock or trailer. The bumpers 12 have a front surface that spaces the trailer a few inches from the front wall 11 of the dock 10. The horizontal upper surface 14 of the dock 10 is elevated above the ground surface or roadway so that the bed of the trailer is generally level with the upper surface of the dock. A dock leveler is frequently provided to accommodate any difference in height between the bed of the trailer and the upper surface 14 of the dock 10. The dock leveler has a deck that is hingeably secured to be even with the upper surface 14 of the dock 10. An extendable lip is hingeably secured to the front of the deck. A lift mechanism (not shown) in a pit of the dock 10 moves the deck and lip between stored and operating positions. When in the operating position, the deck and lip form a ramp between the bed of the trailer and the upper surface 14 of dock 10.

The present invention generally relates to a loading dock trailer restraint that is generally shown as reference number 20 in FIGS. 1-6. The trailer restraint 20 is provided for installation as a prefabricated, pre-welded and generally preassembled device or apparatus. The restraint 20 is designed for a loading dock 10 with or without a dock leveler. The trailer restraint 20 is located directly in front of the dock stall and below any dock leveler. The restraint 20 is preferably centered in front of the leveler between any spaced apart bumpers 12. The restraint 20 and its components are robustly designed to withstand a simulated trailer pull-out force of about 100,000 lbs. Various components are made of steel, and are welded together for increased strength. The steel components are zinc plated for high corrosion resistance.

The trailer restraint 20 includes a rear mounting plate 31 anchored to the front wall 11 of the loading dock 10. The mounting plate 31 is made of steel and has a uniform thickness of about ⅜ of an inch. The plate 31 has flat front and rear surfaces. The rear surface of the plate 31 flushly engages the front wall 11 of the dock 10 so that its front surface is vertically orientated and parallel to the front of the dock. The plate 31 has a generally rectangular shape with top, bottom and side edges. The plate 31 is about 26 inches tall, 19 inches wide and ⅜ inches thick. The plate 31 is anchored to the front 11 of the dock 10 by a number of bolts located proximal to its side edges. The fasteners are preferably concrete expansion anchors or concrete wedge anchors. Alternatively, the plate 31 can be welded to an embedded, steel, dock face plate (not shown).

A vertical track 32 is formed by the mounting plate 31 and two spaced apart L-shaped flanges 33 that forms a central vertical channel about 6 inches wide. The flanges 33 are welded or otherwise rigidly secured to the mounting plate 31, and are robustly sized to handle the large loads experienced during operation. The top and bottom edges of the track 32 are generally flush with the top and bottom edges of the mounting plate 31, so that the track 32 has a total height of about 26 inches. A steel cap is secured to the top of the track 32 to close the track.

Figure 2:
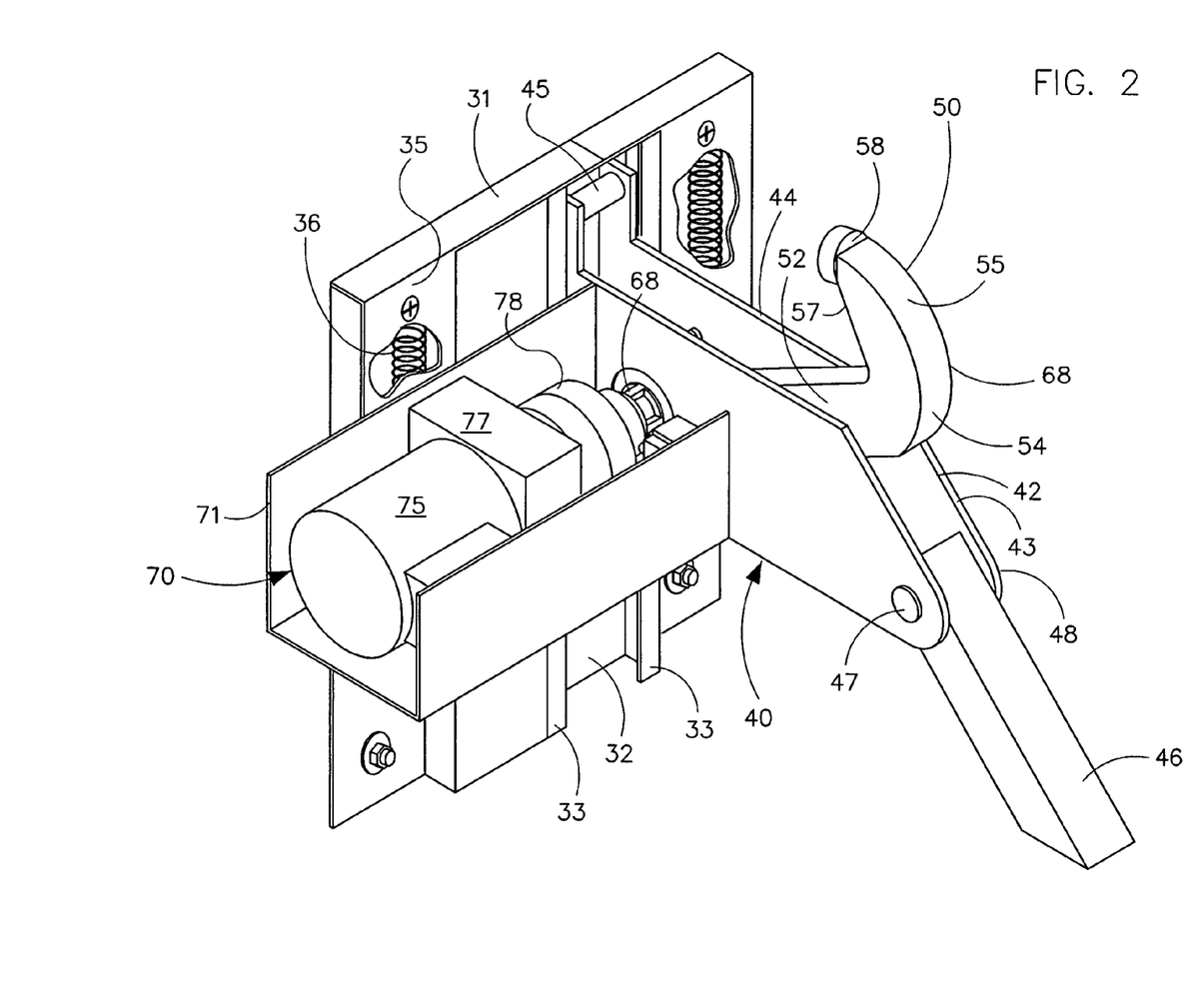
FIG. 2 is an enlarged perspective view of the vehicle restraint in its operative raised position with its cover plates removed to show the electric motor and shaft assembly and the biasing springs.
Figure 3:
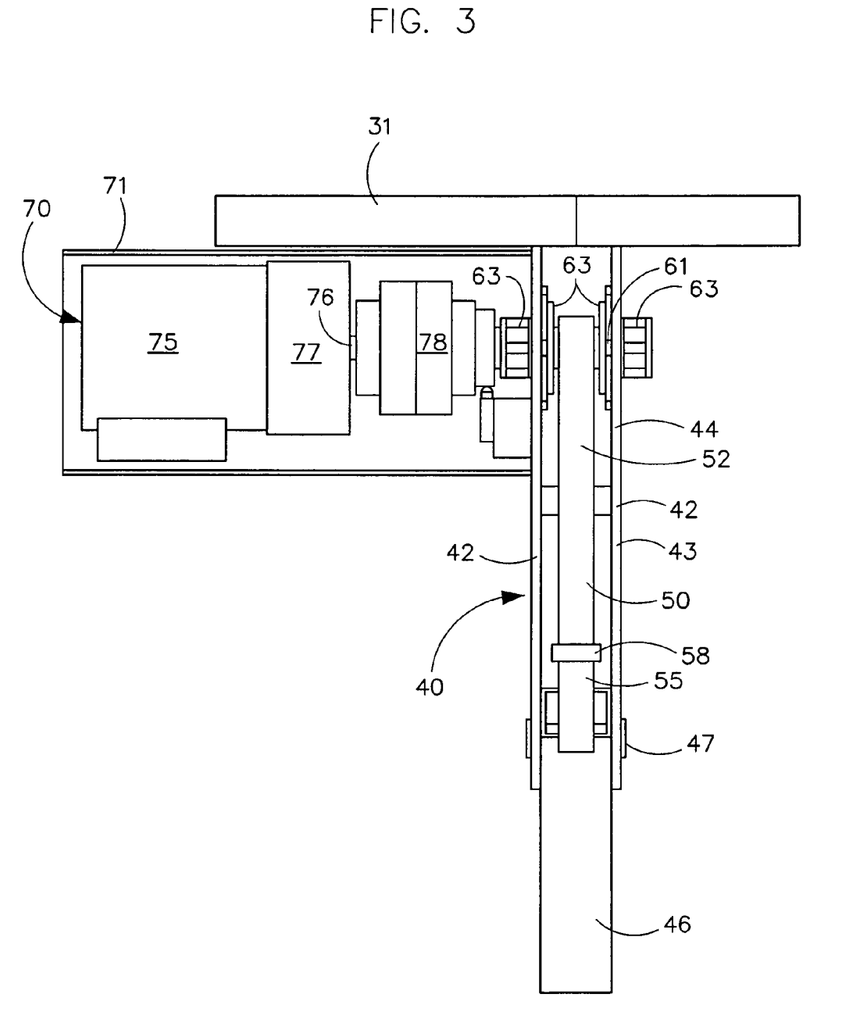
FIG. 3 is a top view of the electric motor and shaft assembly.

Spring housings 35 are rigidly secured to the mounting plate 31 as best shown in FIG. 2. The spring housings 35 straddle the track 32. Each housing 35 includes one or more springs 36 to bias the vehicle restraint 20 into an upper position. One end of each spring 36 is secured to the top of its spring housing 35, and the opposed end of each spring is secured to the lower surface of the carriage assembly 40 (not shown). Each spring is sized to produce an average force of about 450 Newtons. Three springs 36 are preferably located on the motor side of the track 32 and one spring 36 is preferably located on the opposite side of the track to provide a more balanced lifting force for the carriage assembly 40.

The carriage assembly 40 extends horizontally from the mounting plate 31 and is slidably secured in the vertical track 32. The carriage assembly 40 includes two similarly shaped shear plates 42. Each plate 42 is ⅜ inch thick and made of steel. The plates 42 are in aligned registry, parallel and spaced about 2½ inches apart. The shear plates 42 have downwardly sloped front ends 43 and flat horizontal upper ends 44. The flat vertical rear ends of the shear plates 42 are received by and extend into the track 32. The plates are joined together by a pair of upper and lower guide rollers 45. The guide rollers 45 include elongated axles (not shown) that pass through both plates 42 and engage the angle flanges 33 of the track 32. The elongated axles prevent the carriage 40 from pulling horizontally away from the mounting plate 31, while the rollers 45 allow the carriage 40 to move vertically up and down in the track 32. The mounting plate 31, angle flanges 33, elongated axles of the rollers 45 and shear plates 42 hold the carriage 40 horizontally fixed to the front surface of the dock 10 to prevent outward movement or pull out of the carriage 40 from the dock 10.

The carriage 40 has a sloped forward surface formed by the shear plates 42 and a toe piece 46. The toe piece 46 is flushly positioned between the parallel shear plates 42 and extends at a downward angle from the plates to increase the length of the sloped forward surface of the carriage 40. The upper surface of the toe piece 46 is flushly aligned with the downwardly sloped front ends 43 of the shear plates 42. The bottom edge of the toe piece 46 is generally horizontally aligned with the lower edge of the mounting plate 31. A toe pin 47 joins the front ends of the shear plates 42 and the toe piece 46 together. The springs 36 of the vehicle restraint 20 bias the carriage 40 into an upper position 48.

The carriage assembly 40 carries a rotatable hook 50 to selectively engage and disengage the ICC bar 5 to hold the truck trailer against the loading dock 10. The hook 50 has an inner straight section 52, an elbow 54 and a pendent hooked end 55. The hooked portion 55 has an inner surface 57 and a grip disc 58. The hook 50 nests between the shear plates 42, and is rotatably secured to the plates by a hook pin 61. The hook pin 61 is held to its respective plate 42 by a hub and bearing assembly 63. The hub and bearing assemblies 63 allow the hook to rotate about and transfer large loads to shear plates 42. The hook 50, hook pin 61 and hub and bearing assemblies 63 are robustly sized to handle the large loads experienced during operation.

Figure 4:
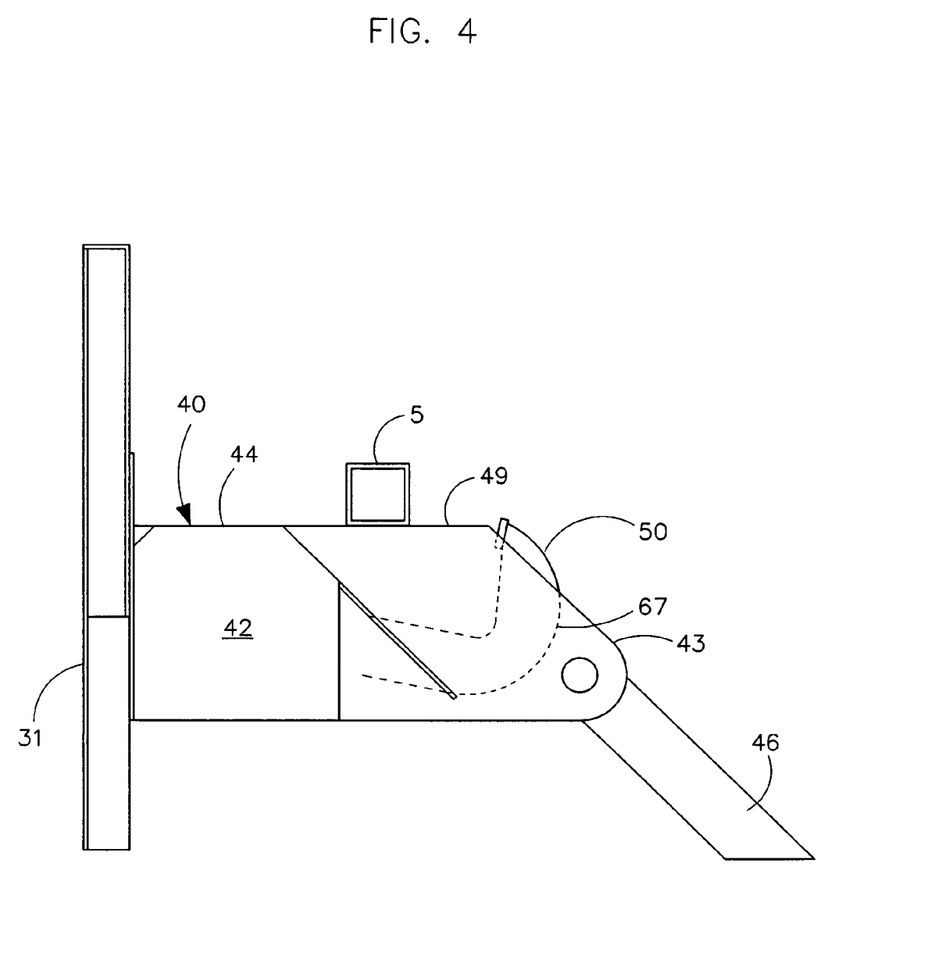
FIG. 4 is a side view of the present inventive impact restraint showing the hook in its lowered or stored position.
Figure 5:
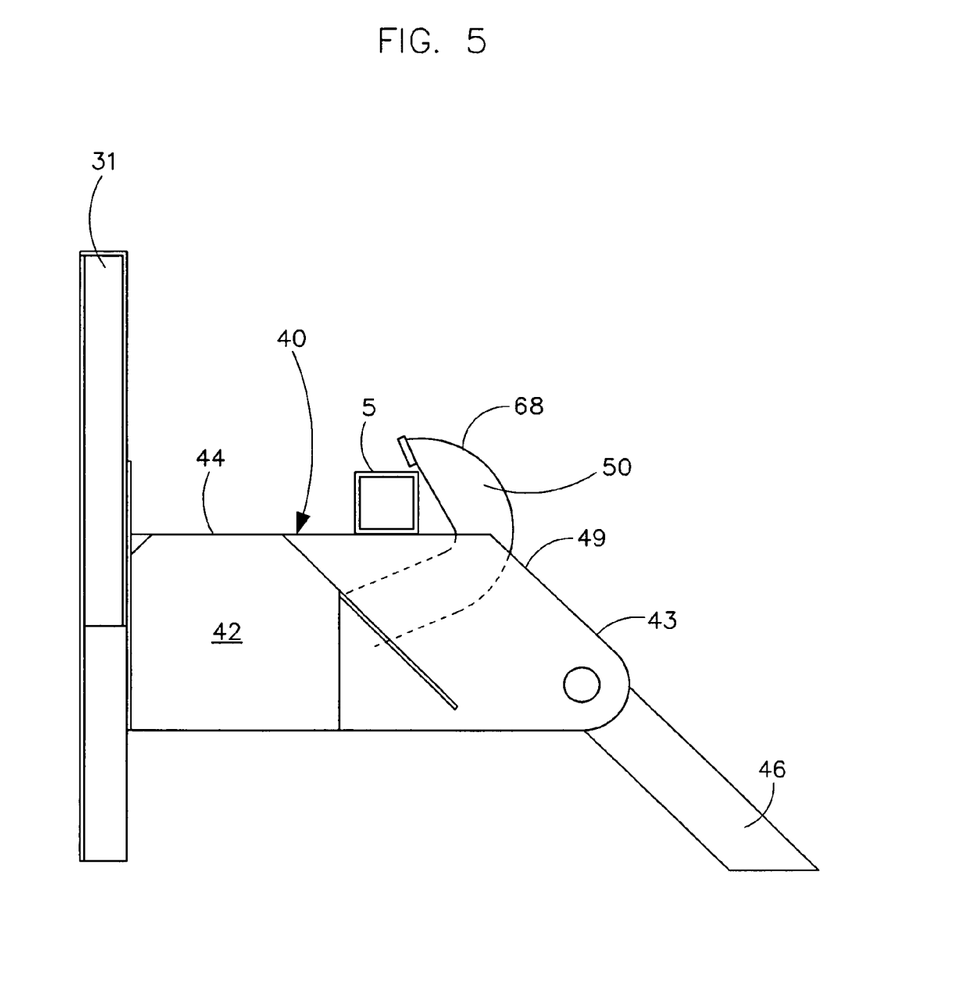
FIG. 5 is a side view of the present inventive impact restraint showing the hook in its engaged position for holding the ICC bar and the motor moving the hook back into engagement with the ICC bar during the process of loading and unloading the trailer.
Figure 6:
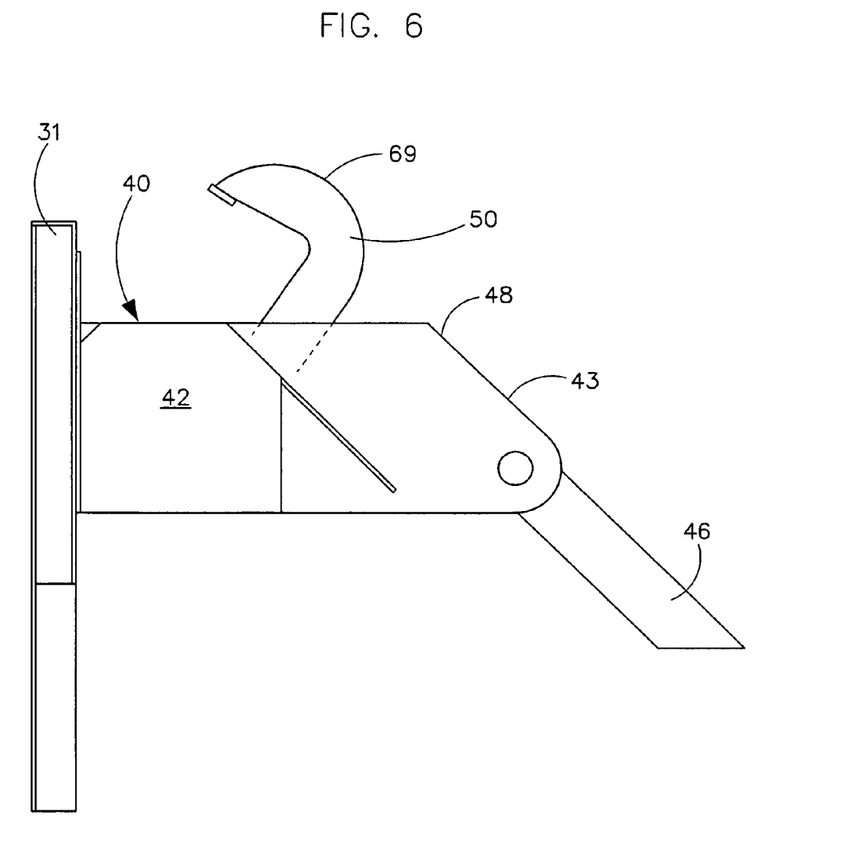
FIG. 6 is a side view of the present inventive impact restraint showing the hook in its full up or fault position without engaging an ICC bar.

The hook 50 is housed between the shear plates 42 and below their ramped and upper edges 43 and 44 when it is in a lower stored position 67 shown in FIG. 4. In this retracted or stored position 67, the ICC bar 5 of a trailer is free to slide along the ramped front 43 of the carriage 40 and up onto its upper edge 44 without engaging the hooked portion 55. During operation, when the ICC bar 5 is above the upper edge of the carriage 40, the hook 50 rotates from the retracted position 67 to a raised operating position 68 to engage the ICC bar 5 as shown in FIG. 5. This hooked engagement locks the ICC bar 5 and trailer to the loading dock 10. If the trailer does not have an ICC bar 5 or the trailer and ICC bar are not properly positioned relative to the loading dock 10 and trailer restraint 20, then the hook 50 will not engage the ICC bar and rotate to an uppermost position 69 as shown in FIG. 6. A sensor activates when the hook 50 reaches its uppermost position 69 to indicate that the hook did not engage the ICC bar 5 to lock the trailer to the loading dock 10.

A drive unit 70 selectively rotates the hook 50 between its stored position 67 and its raised operating position 68. The drive unit 70 is mounted inside a protective housing 71 that is rigidly secured to the side of one of the shear plates 42. The drive unit 70 rotates the hook 50 to keep it in torque engaging contact with the ICC bar 5 during operation. The housing 71 has a removable cover 72 to allow access to the drive unit 70 as shown in FIG. 2. The drive unit 70 includes an electric motor 75 that turns a drive shaft 76. A motor mount 77 collinearly aligns the drive shaft 76 with the hook pivot pin 61, and a coupling 78 rotationally joins the motor drive shaft 76 to the hook pin 61. The coupling 78 is preferably a direct one-to-one coupling between the motor drive shaft 76 and the hook pin 61 to obtain a better mechanical advantage.

The electric motor 75 is a constant torque, alternating current (AC), motor that continues to apply torque after the hook 50 rotates to its operating position 68 and is engaging the ICC bar 5. The gearmotor 75 preferably uses a helical gear to produce a 180:1 gear ratio to allow direct coupling 78 between the drive shaft 76 and the hook pin 61. The gearmotor 75 has at least two modes of operation. In its first or higher power mode, the gearmotor 75 draws 0.75 amps at 120 volts, and produces 305 lb-in of torque. The gear reduced no-load output shaft speed is 10 rpm. This mode of operation is used to rotate the hook 50 to and from its stored and engaged positions 67 and 68. Once the hook 50 engages 68 the ICC bar 5, the output shaft of the motor 75 stops rotating, but maintains its torqued engagement with the ICC bar. In its second or lower power mode, the gearmotor 75 draws 0.6 amps at 85 volts, and produces 135 lb-in of torque. This mode of operation is used while the hook 50 remains engaged 68 with the ICC bar 5. Torqued engagement with the ICC bar 5 continues until the motor 75 rotates the hook 50 back to its stored position 67. The higher power mode is meant to quickly overcome hook inertia as well as to aid in overcoming external resistances to motion such as (dirt, snow, etc.). The lower power mode is intended to allow the motor to be powered continuously without risk of overheating.

Figure 7:
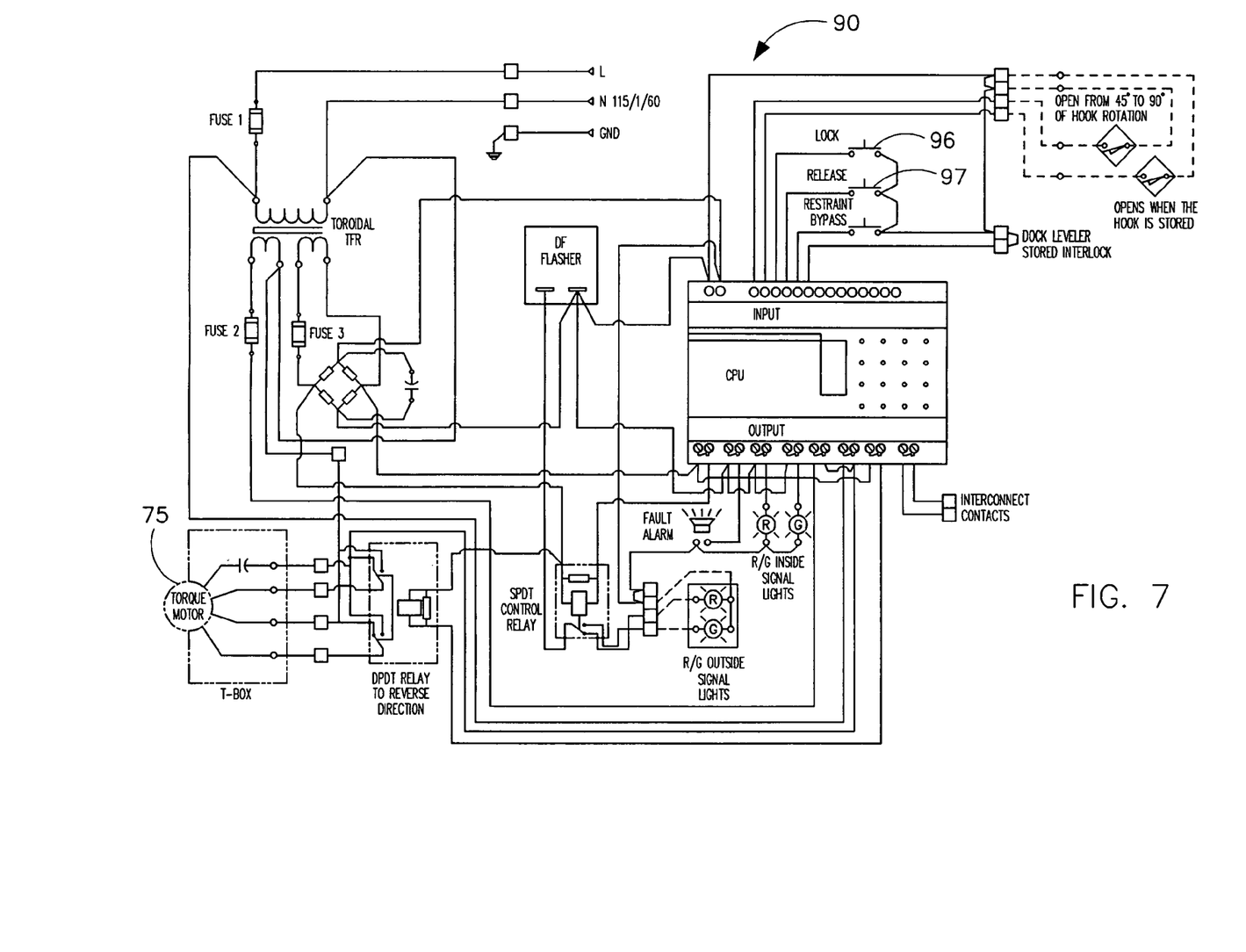
FIG. 7 is an electrical schematic of the control system of the present invention.

The constant duty motor 75 is controlled by a control system 90 of a control unit 95 with a hook lock switch 96 and a hook release switch 97. The control system 90 turns the motor 75 on and off, and switches between high and low power modes of operation. An electrical schematic of the control system 90 is shown in FIG. 7. Each operating cycle includes a hook engagement phase, a hook holding phase and a hook return phase. During the hook engagement phase, the control system 90 activates the motor 75 and operates the motor at its higher power mode. During this phase, the motor 75 rotates the hook 50 from its stored position 67 to its engaged positions 68. The duration of this phase is timed by the control system 90, and is preferably about 5 seconds. During the hook holding phase, the control system 90 keeps the motor 75 activated, but operates the motor at its lower power mode. The control system 90 operates the motor 75 at this lower power level indefinitely or at least until the loading and unloading of the truck trailer is complete. This operating phase is to maintain the hook 50 in forced or torqued engagement with the ICC bar 5 while the trailer is hooked to the loading dock. When the loading and/or unloading process is complete, the control system 90 is selectively switched to the hook disengaging phase. During this phase, the motor 75 is operated at its high power mode but in the reverse direction to rotate the hook 50 from its engaged position 68 to its stored position 67. The duration of the phase is timed by the control system 90 and is also preferably about 5 seconds. When the hook 50 reaches its stored position 67, the control system deactivates the motor 75 and stops supplying amperage and voltage to the motor. With the hook out of the way and the operating cycle complete, the trailer can pull away from the loading dock. When the ICC bar 5 clears the carriage 40, the springs 36 return the carriage to its upper position 49.

Operation of Constant Torque Vehicle Restraint

Although the operation of the hydraulically powered embodiment of the vehicle restraint 20 should be apparent from the above description, the following is provided to assist the reader in more readily understanding one possible method of operating this device. When a vehicle trailer is backed into the loading dock 10, the carriage 40 is in its upper position 48 with the hook stored 67 between the shear plates 42 of the carriage 40 as in FIG. 4. When the ICC bar 5 is lower than the upper surface 44 of the carriage 40, the ICC bar impacts the ramped surface 43 of the carriage to vertically lower the carriage along it track 32 until the ICC bar slides onto its upper surface 44. When the trailer is safely in the dock 10 with its ICC bar 5 engaging or sufficiently close to the face wall 11 or bumpers 12 of the dock, the control system 90 is turned on via lock switch 96 to activate the gearmotor 75 through an operating cycle. The control system 90 activates the gearmotor 75 to a high power mode for 5 seconds to rotate the hook up and into engagement 68 with the ICC bar 5. The ICC bar 5 is now captured by the hook 50 and carriage 40, and the trailer is held against the loading dock 10 as in FIGS. 1 and 5.

With the hook 50 raised and engaging 68 the ICC bar 5, the control system 90 automatically turns the motor 75 to a low power mode to keep the hook in forced or torqued engagement with the ICC bar 5 during the entire process of loading and unloading the trailer. The gearmotor 75 and its direct coupling 78 with the hook 50 allow the hook to rotate back and forth to accommodate any rocking of the trailer during the loading and unloading process. The gearmotor 75 allows its drive shaft 76 to slip or rotate backwards without damaging the motor. Even after slipping, the gearmotor 75 continues to apply a constant torque to actively keep the hook 50 in forced engagement with the ICC bar 5. This constant torque helps prevent "dock walk" that can result in the hook inadvertently disengaging from the ICC bar.

When the trailer loading and unloading process is complete, the control system 90 is switched via release switch 97 to turn the gearmotor 75 to a reverse high power mode. The reverse high power mode rotates and lowers the hook back to its stored position 67. When the hook 50 reaches its stored position 67, it trips a sensor to turn off the motor and signal that the operating cycle is complete, and the trailer is free to pull away from the loading dock.

While this invention is susceptible to embodiments in many different forms, the drawings show and the specification describes a preferred embodiment of the invention. It should be understood that the drawings and specification are to be considered an exemplification of the principles of the invention. They are not intended to limit the broad aspects of the invention to the embodiment illustrated. Various changes may be made and equivalents may be substituted without departing from the broader aspects of the invention.

I claim:

1. A constant torque vehicle restraint for securing a trailer to a loading dock during loading/unloading of the trailer, the loading dock having a face wall and the trailer having an ICC bar, said constant torque vehicle restraint comprising:
   a track anchored proximal the face wall of the dock;
   a carriage movably joined to said track and adapted to allow engagement with the ICC bar, said carriage having a hooking mechanism selectively movable between retracted and extended positions and adapted to capture the ICC bar when in said extended position;
   a multi-mode electric motor operable at one of either a higher power level and a lower power level, said motor being adapted for continuous operation at said lower power level, said motor having a drive shaft drivingly connected to said hooking mechanism, and said motor being adapted to apply torque to said drive shaft in one of either a first rotational direction and a second opposite rotational direction;
   a control unit with a lock switch, a release switch and a processor to cycle said motor and hooking mechanism through an operating cycle including a hook extending phase, a continuous torque phase and a hook retracting phase; and,
   wherein said lock switch is operable to activate said motor to apply torque to said drive shaft in said first rotational direction at said higher power level to move said hooking mechanism from said retracted position to said extended position during said extending phase to capture the ICC bar prior to loading/unloading of the trailer, said processor is programmed to operably switch said motor to said lower power level after a time period sufficient for said hooking mechanism to capture the ICC bar, said motor continuously operating in said lower power level during said continuous torque phase to continuously apply torque to said drive shaft and maintain said hooking mechanism in forced engagement with the ICC bar during loading/unloading of the trailer, and said release switch is operable to switch said motor to apply torque to said drive shaft in said second opposite rotational direction at said higher power level during said hook retracting phase to move said hooking mechanism from said extended position to said retracted position after loading/unloading of the trailer.

2. The constant torque vehicle restraint of claim 1, and wherein said hooking mechanism rotates about a hook pin between said retracted and extended positions, and said drive shaft is directly connected to said hooking mechanism, and said drive shaft and hooking mechanism rotate together in unison.

3. The constant torque vehicle restraint of claim 1, and wherein said multi-mode electric motor operates at about 120 volts to produce at least about 300 lb-in of torque at said higher power level, and operates at about 85 volts to produce at least about 130 lb-in of torque at said lower power level, and said motor is a gearmotor with at least about a 180:1 gear ratio.

4. The constant torque vehicle restraint of claim 3, and wherein said drive shaft of said electric motor has a gear reduced no-load output speed of at least about 10 rpm during said higher power level, and said time period sufficient for said hooking mechanism to capture the ICC bar is about 5 seconds.

5. The constant torque vehicle restraint of claim 1, and wherein said control unit includes a sensor for determining when said hooking mechanism returns to said retracted position, and said processor is programmed to operably deactivate said motor after said hooking mechanism returns to said retracted position.

6. The constant torque vehicle restraint of claim 1, and wherein said vehicle restraint is an impact vehicle restraint, said electric motor is held by and travels with said carriage, said carriage has a sloped front end and an upper end and is movable between an upper position and a lower ICC bar engaging position, said carriage being biased toward said upper position, said hooking mechanism being stored below said sloped and upper ends of said carriage when in said retracted position, and said hooking mechanism extending above said upper end when in said extended position.

7. The constant torque vehicle restraint of claim 6, and further including a mounting plate having a biasing mechanism, and wherein said biasing mechanism biases said carriage toward said upper position, and said hooking mechanism is stored within said carriage when in said retracted position.

8. The constant torque vehicle restraint of claim 7, and wherein the face wall of the dock is substantially vertical, said track is rigidly secured to said mounting plate, and said mounting plate is anchored to the face wall, and said carriage has rear rollers received by said track to slidingly join said carriage to said track to allow said carriage to move along a substantially vertical path of travel.

9. The constant torque vehicle restraint of claim 7, and wherein the trailer moves vertically up when being unloaded and moves vertically down when being loaded, said vertical movement resulting in a vertical displacement of the ICC bar, and said biasing mechanism biases said carriage to follow said vertical displacement of the ICC bar to maintain said carriage in engagement with said ICC bar during the loading/unloading of the trailer; and, wherein the trailer rocks away from and toward the loading dock during the loading/unloading of the trailer, and said electric motor maintains said hooking mechanism in forced engagement with the ICC bar during the loading/unloading of the trailer.

* * * * *